US006443181B1

United States Patent
Powell

(10) Patent No.: US 6,443,181 B1
(45) Date of Patent: Sep. 3, 2002

(54) BACKFLOW PREVENTION APPARATUS

(75) Inventor: Douglas H. Powell, Sacramento, CA (US)

(73) Assignee: Hunter Innovations, Inc., Sacramento, CA (US)

( * ) Notice: Subject to any disclaimer, the term of this patent is extended or adjusted under 35 U.S.C. 154(b) by 0 days.

(21) Appl. No.: 09/753,219

(22) Filed: Dec. 28, 2000

(51) Int. Cl.⁷ ............................................... F16K 15/03
(52) U.S. Cl. .................. 137/512; 137/218; 137/315.16; 137/614.2; 251/337
(58) Field of Search ................................. 137/215, 218, 137/315.16, 315.33, 454.2, 512, 527, 527.6, 614.2; 251/337

(56) References Cited

U.S. PATENT DOCUMENTS

| | | | | |
|---|---|---|---|---|
| 3,276,465 A | * | 10/1966 | Wyckoff | .................... 137/107 |
| 4,090,527 A | * | 5/1978 | Sutherland | .................. 137/215 |
| 4,284,097 A | * | 8/1981 | Becker et al. | .............. 137/218 |
| 4,508,139 A | | 4/1985 | Teumer | |
| 4,552,174 A | * | 11/1985 | Carl et al. | ................ 137/527.2 |
| 4,809,739 A | | 3/1989 | Scaramucci | |
| 4,809,741 A | | 3/1989 | Scaramucci | |
| 4,893,654 A | | 1/1990 | Feuz | |
| 5,031,661 A | | 7/1991 | Feuz | |
| 5,046,525 A | * | 9/1991 | Powell | ....................... 137/512 |
| 5,236,009 A | * | 8/1993 | Ackroyd | .................. 137/454.2 |
| 5,584,315 A | * | 12/1996 | Powell | ..................... 137/15.18 |
| 5,669,405 A | * | 9/1997 | Engelmann | .................. 137/107 |
| 5,671,769 A | * | 9/1997 | Booth et al. | ............. 137/15.18 |
| 5,709,240 A | | 1/1998 | Martin et al. | |
| 5,711,341 A | | 1/1998 | Funderburk et al. | |
| 5,785,077 A | | 7/1998 | Rice | ........................... 137/315 |
| 5,794,655 A | | 8/1998 | Funderburk et al. | |
| 5,913,331 A | | 6/1999 | Noll et al. | |
| 5,947,152 A | * | 9/1999 | Martin et al. | ................ 137/512 |
| 6,314,993 B1 | | 11/2001 | Matthews et al. | |
| 6,343,618 B1 | | 2/2002 | Britt et al. | |
| 6,349,736 B1 | | 2/2002 | Dunmire | |

* cited by examiner

Primary Examiner—Michael Powell Buiz
Assistant Examiner—Ramesh Krishnamurthy
(74) Attorney, Agent, or Firm—Bozicevic, Field & Francis LLP

(57) ABSTRACT

A check valve apparatus, usable in a double check valve backflow preventer apparatus, comprising a valve seat, a clapper pivotally coupled to the valve seat, a seal positioned to sealingly engage the clapper and valve seat when the clapper is closed against the seat, and a closure mechanism. The closure mechanism includes a first linkage element pivotally associated with the valve seat at a first pivot point located upstream from the seal, a second linkage element which is pivotally coupled to the first linkage element at a second pivot point, and which is pivotally associated with the clapper at a third pivot point, and a bias element associated with at least one of the linkage elements and configured to exert a closure force on the clapper.

27 Claims, 16 Drawing Sheets

BACKFLOW PREVENTION APPARATUS

BACKGROUND OF THE INVENTION

1. Field of the Invention

The present invention pertains generally to devices, assemblies and systems for backflow prevention, and more particularly to a compact, light weight, low maintenance double check valve backflow prevention apparatus of modular construction which provides low flow losses.

2. Description of the Background Art

Backflow prevention devices are widely used to prevent undesirable flow reversal under low flow, static or backpressure situations wherein clean upstream fluid sources can be contaminated by downstream fluid. Backflow prevention devices typically comprise one or two check valves, housed within a valve body, which undergo closure under backflow, backpressure or back siphonage conditions. The use of backflow prevention devices is generally required by law for cross-connected water supplies where potable water could undergo contamination due to flow reversal or back pressure conditions.

Currently used double check valve backflow preventers have proved deficient in various respects. Particularly, such back flow preventers are prone to relatively high flow losses due to the valve configurations and closure mechanisms employed, especially under low flow conditions. Further, back flow preventer assemblies typically require a bulky, heavy cast housing with a side port tube or extension and a separately cast port cover. This type of housing is expensive to manufacture and requires a substantial amount of space to accommodate the side port tube and cover. The check valves are typically bolted to seats within the housing, and can only be reached through the side port tube, which hinders access to the check valves. Maintenance and replacement of the check valves requires a person to reach through the side port tube and loosen bolts, compression rods or other internal hardware in order to remove the check valves, and thus tends to be a difficult and expensive operation.

Accordingly, there is a need for a backflow prevention apparatus which is compact and light weight, which is easy and inexpensive to manufacture, which does not have a side port tube, which provides easy access to internal check valves, which has check valves with simple, low-friction closure mechanisms, and which provides low flow losses. The present invention satisfies these needs, as well as others, and generally overcomes the deficiencies found in the background art.

SUMMARY OF THE INVENTION

The invention is a double check valve backflow prevention apparatus which provides low flow losses and which maintains a small positive pressure differential under static flow conditions. In its most general terms, the invention is a check valve apparatus, usable in a backflow preventer, which comprises a valve seat, a clapper pivotally coupled to the valve seat, a seal positioned to sealingly engage the clapper and valve seat when the clapper is closed against the seat, and a closure mechanism. The closure mechanism includes a first linkage element or member pivotally associated with the valve seat at a first pivot point located upstream from the seal, a second linkage element or member which is pivotally coupled to the first linkage element at a second pivot point, and which is pivotally associated with the clapper at a third pivot point, and a bias element associated with at least one of the linkage elements and configured to exert a closure force on the clapper.

By way of example, and not of limitation, the linkage elements of the closure mechanism preferably are elongated in shape, with the second linkage element being longer than the first linkage element. The first linkage element includes first and second ends, with the first end pivotally coupled to the first pivot point. The second linkage element likewise has first and second ends, with the first end of the second linkage element pivotally coupled to the second end of the first linkage element at the second pivot point. The second end of the second linkage element is coupled to the clapper at the third pivot point. The second linkage element may be bifurcated such that two halves of the second linkage element fit around the second end of the first linkage element.

The first pivot point is preferably associated with the valve seat, with the first pivot point being located at an upstream position with respect to the seal. Preferably, a rod or bar extends across the flow path defined by the valve seat, with the first pivot point defined by the rod and the first linkage element pivotally attached to the rod. The bias element preferably comprises a spring mounted on the rod extending across the flow path, with the spring configured to exert a force on the first linkage element. Preferably, detachable holders are included on the valve seat which allow quick and easy detachment of the rod for replacement of the spring and maintenance of the closure mechanism. In other embodiments of the invention, the first linkage element may be pivotally coupled to a valve housing or body which is separate from the valve seat.

The valve seat is preferably annular in shape and defines a flow path through the valve seat. The clapper preferable is hinged to a lower edge of the seat. The seal is preferably located on the clapper, and a lip is included on the valve seat and is configured to sealingly engage the seal when the clapper is closed. The seal may alternatively be positioned on the valve seat, with the clapper having a corresponding lip to engage the seal.

In the presently preferred embodiments, the invention is embodied in a backflow prevention apparatus comprising a valve housing and first and second check valves positioned within the valve housing. Various valve housing configurations may be used with the invention, including conventional cast valve housings having a side extension or flange and detachable cover mounted on the flange. More preferably, the backflow preventer apparatus of the invention comprises a tubular valve body with a flangeless side or lateral opening, and an external sleeve which slides or fits over the housing to cover the lateral opening and define a complete valve body. The first and second check valves fit within the valve body and are positioned with the first check valve adjacent the upstream edge of the lateral opening, and with the second check valve positioned adjacent the downstream edge of the lateral opening. The check valves are held against the edges of the lateral opening by means of a spacer, compression rods, or like separating element. An annular seal is included around the exterior of the valve seat of each check valve, and sealingly engages the valve housing when the check valves are in place.

The sleeve includes annular seals on its inner surface, and when the sleeve is in place over the lateral opening, the sleeve, housing, and annular seals on the sleeve define a complete, fluid tight valve body, with the check valves, spacer and lateral opening completely covered by the sleeve. The sleeve is held in place by the threaded end of a vent element, which extends through the sleeve and engages a corresponding threaded hole in the spacer or in the valve housing. The sleeve may alternatively be bifurcated or split, with each portion of the sleeve held to the valve housing by a threaded element.

In order to access the check valves, the vent is unthreaded and the sleeve is moved to expose the lateral opening in the valve housing. The spacer holding the check valves in place is removed, and the check valves are removed from the valve housing via the lateral opening. Since the lateral opening does not have a side extension or flange, the check valves are easy to reach, and no further disassembly is required for detaching and removing the check valves.

The dual linkage element closure mechanism of the invention and the positioning of the first pivot point at a location which is upstream from the location of the seal advantageously provides a small positive pressure differential under static and low flow conditions. The dual linkage element closure mechanism of the invention also allows the clapper to open at a relatively wide angle for greater flow when the check valves are open. The dual linkage element closure mechanism of the invention provides the advantageous flow properties of a magnetic closure mechanism without the fouling problems commonly associated with magnetic closure mechanism.

An object of the invention is to provide a backflow prevention apparatus which is compact and light weight.

Another object of the invention is to provide a backflow prevention apparatus which is easy and inexpensive to manufacture.

Another object of the invention is to provide a backflow prevention apparatus of modular construction.

Another object of the invention is to provide a backflow prevention apparatus which does not have a side port tube.

Another object of the invention is to provide a backflow prevention apparatus which does not require a formed port cover.

Another object of the invention is to provide a backflow prevention apparatus which allows quick and easy access to check valves for service, repair and replacement.

Another object of the invention is to provide a backflow prevention apparatus which mechanically produces a check valve closure force which simulates a magnetic closure mechanism without requiring the use of magnets.

Another object of the invention is to provide a backflow prevention apparatus which experiences minimal wear and requires low maintenance.

Another object of the invention is to provide a backflow prevention apparatus which has low friction losses.

Another object of the invention is to provide a backflow prevention apparatus which utilizes venturi-shaped check valves for optimal flow properties.

Another object of the invention is to provide a backflow prevention apparatus which maintains a small positive pressure differential under static flow conditions.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 1:
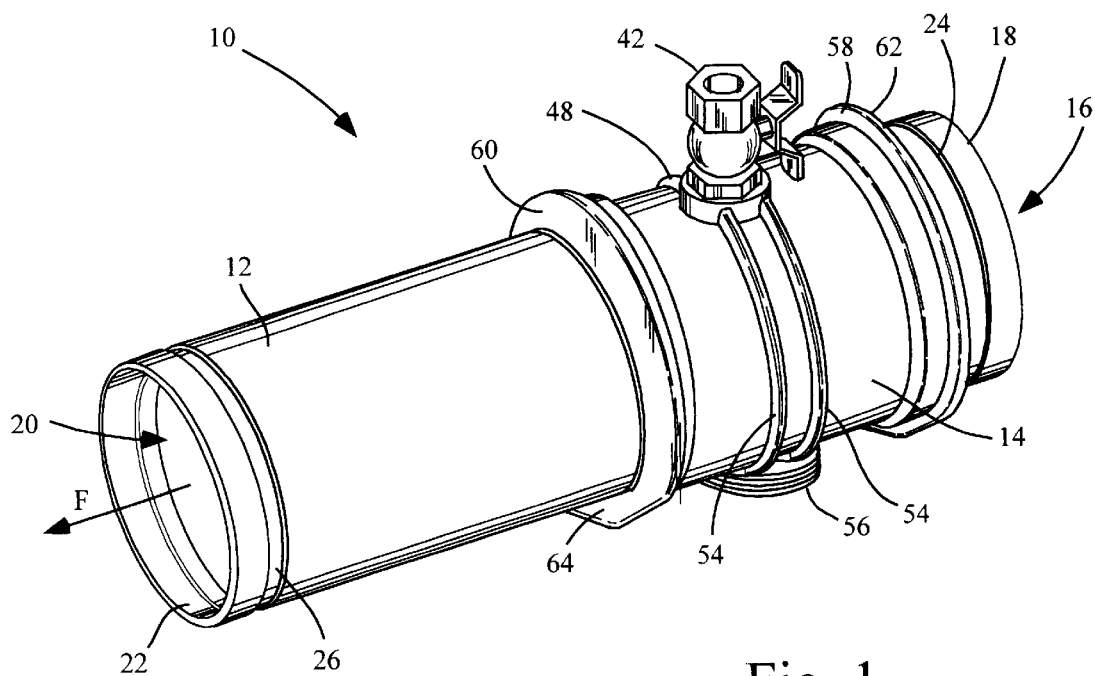
FIG. 1 is a perspective view of a backflow prevention apparatus in accordance with the present invention.
Figure 2:
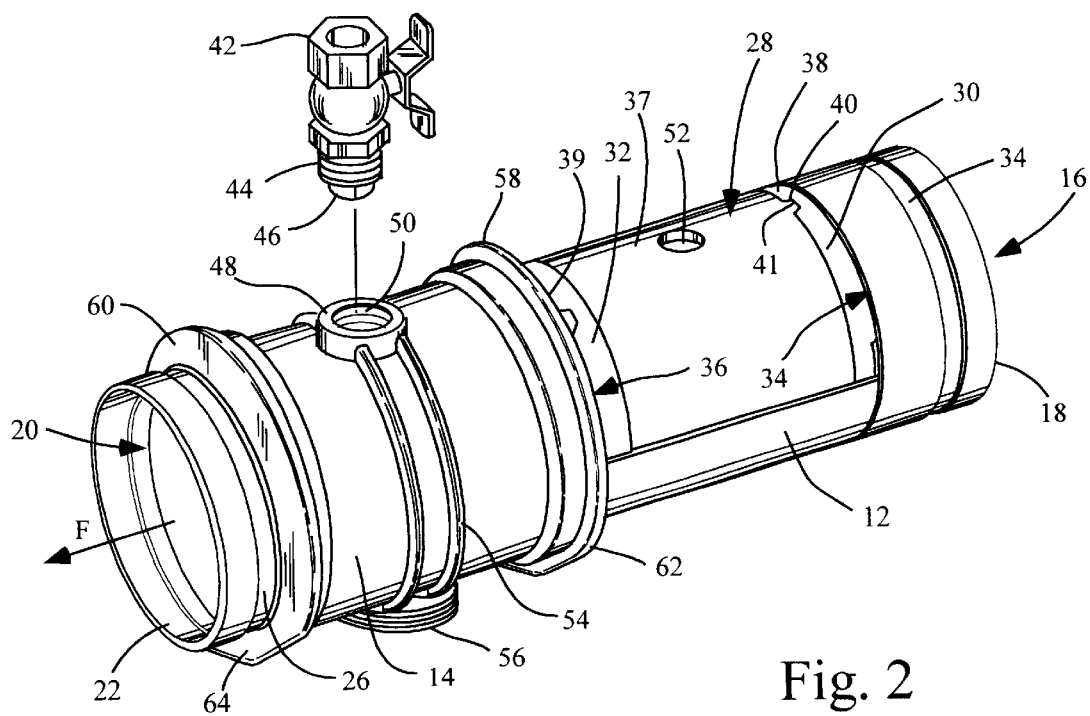
FIG. 2 is a perspective view of the backflow prevention apparatus of FIG. 1 shown with the vent removed, the sleeve positioned away from the lateral opening of the valve body.

Referring more specifically to the drawings, for illustrative purposes the present invention is embodied in the apparatus and graphical data shown generally in FIG. 1 through FIG. 19. It will be appreciated that the apparatus may vary as to configuration and as to details of the parts without departing from the basic concepts as disclosed herein. The invention is disclosed generally in terms of backflow prevention. However, it will be readily apparent to those skilled in the art that the invention may be applied in various situations wherein check valves are used to interrupt fluid flow under selected conditions.

Referring first to FIG. 1 through FIG. 13, a presently preferred embodiment backflow prevention apparatus 10 in accordance with the invention is shown. The backflow preventer 10 includes a generally tubular valve housing 12, and a sleeve or cover 14 which slidably fits over valve housing 12. Valve housing 12 includes an upstream opening 16 adjacent a first or upstream end 18, and a downstream opening 20 adjacent a second or downstream end 22. Coupling grooves 24, 26 are included on housing 12 adjacent upstream and downstream. ends 18, 22 to allow facile coupling of the apparatus 10 into a fluid flow stream. Fluid flow through the backflow preventer apparatus 10 moves generally from upstream to downstream as indicated by arrow F.

Figure 3:
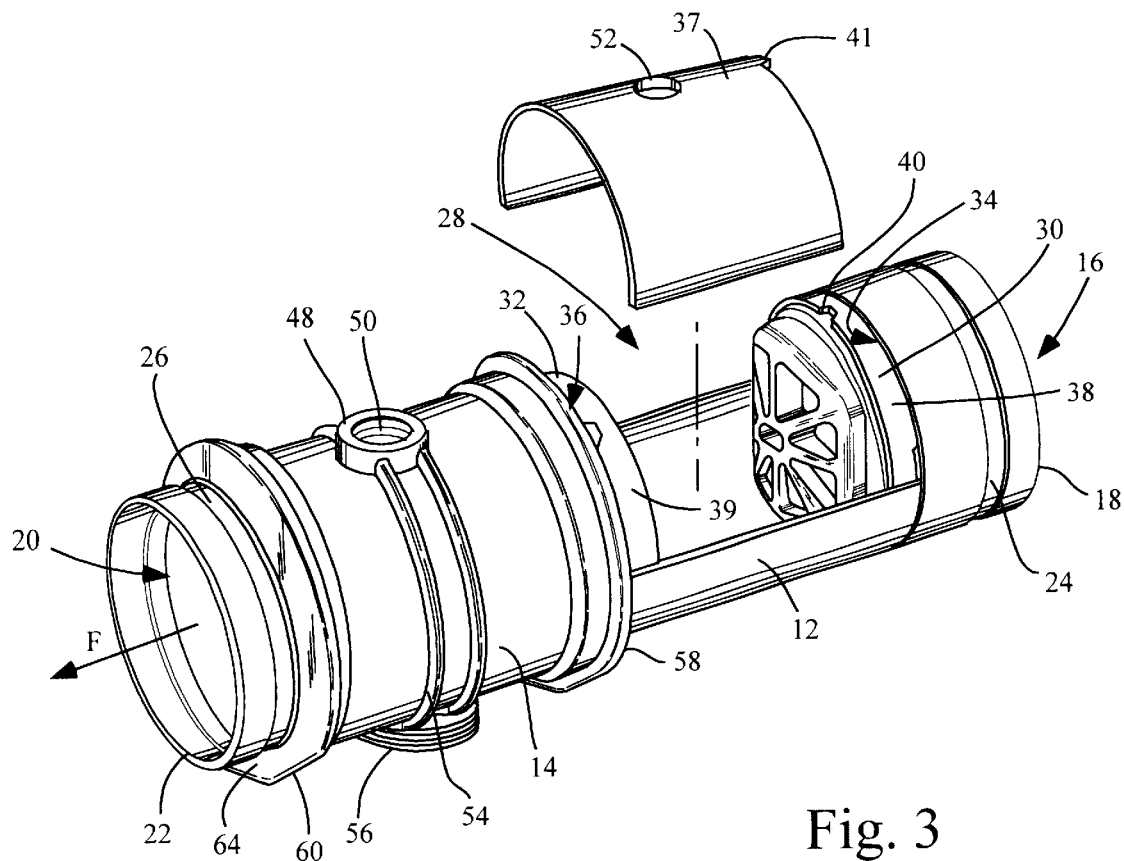
FIG. 3 is a perspective view of the backflow prevention apparatus of FIG. 2 shown with the spacer removed.
Figure 4:
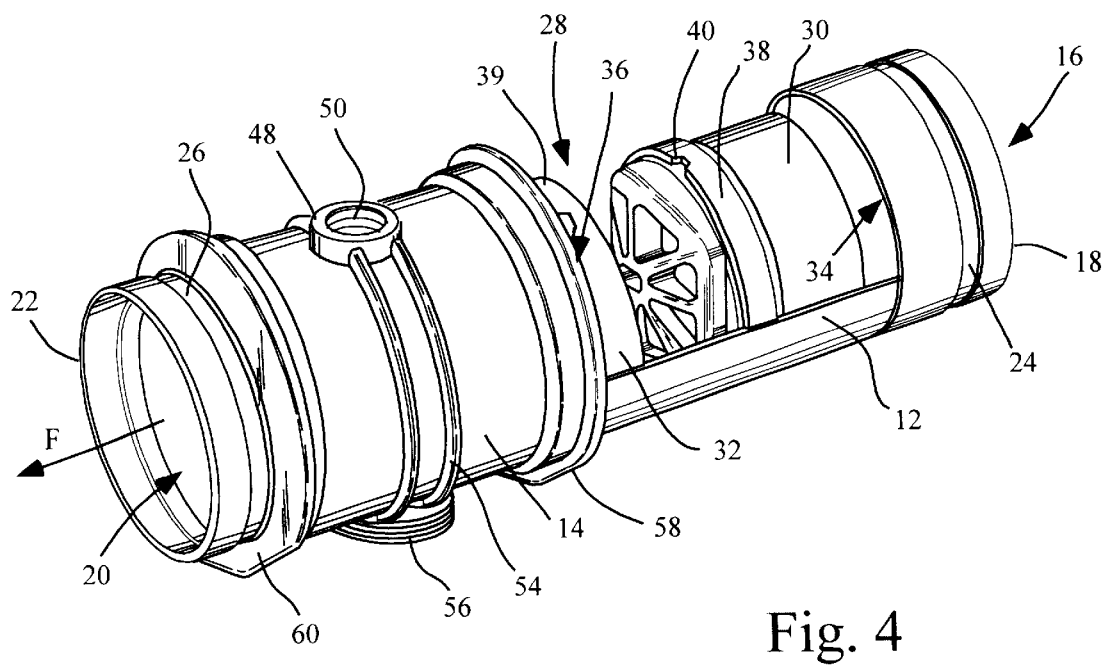
FIG. 4 is a perspective view of the backflow prevention apparatus of FIG. 3 shown with the upstream check valve moved into the lateral opening of the valve body.
Figure 5:
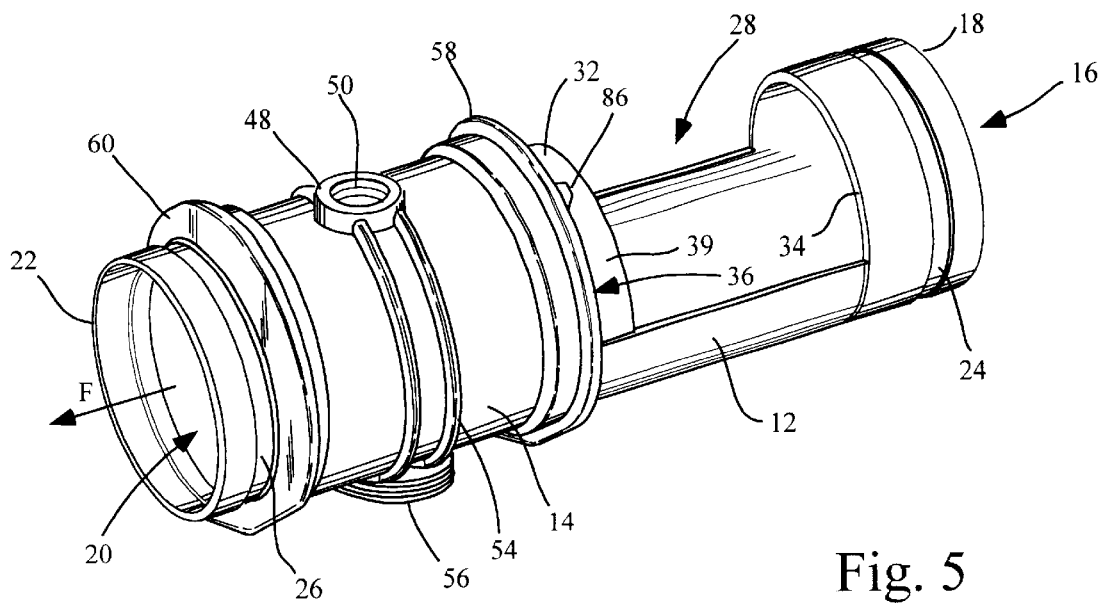
FIG. 5 is a perspective view of the backflow prevention apparatus of FIG. 4 shown with the upstream check valve removed.
Figure 6:
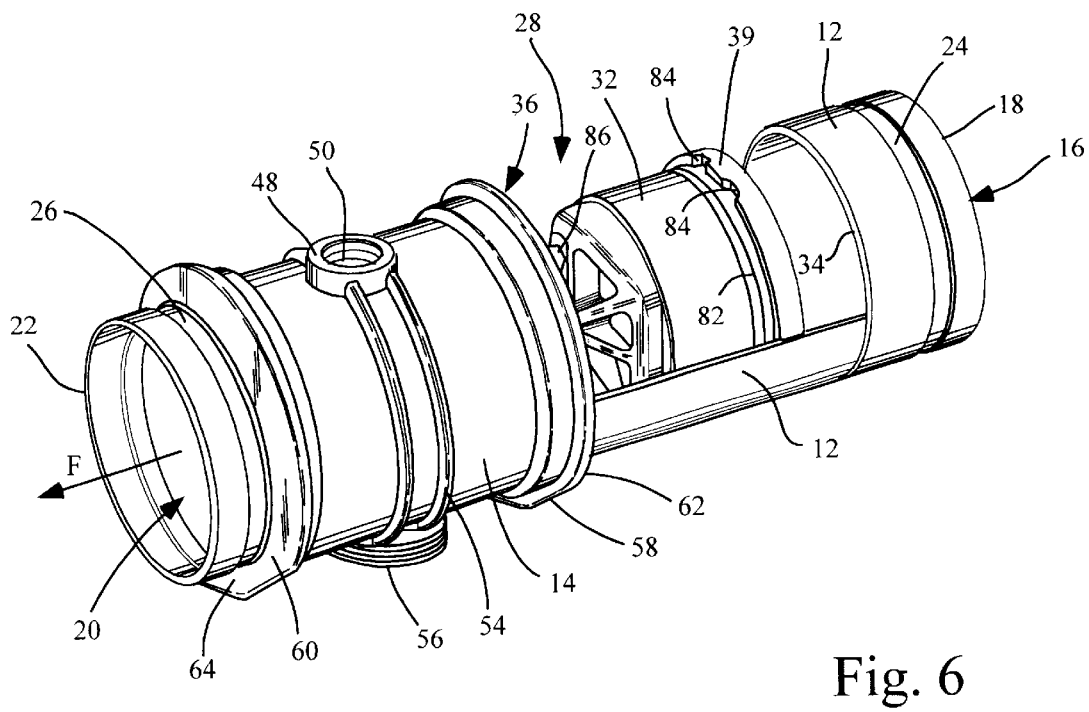
FIG. 6 is a perspective view of the backflow prevention apparatus of FIG. 5 shown with the downstream check valve moved into the lateral opening of the valve body.

Valve housing 12 also includes a side or lateral opening 28, seen most clearly in FIG. 3 and FIG. 5. Sleeve 14 is slidably movable on housing 12 between a first position wherein sleeve 14 covers lateral opening 28, as shown in FIG. 1, and a second position wherein lateral opening 28 is exposed or uncovered, as shown in FIG. 2 through FIG. 6. Lateral opening 28 is preferably flangeless as shown, and sleeve 14 provides a cover for lateral opening 28.

The backflow prevention apparatus 10 includes a first, upstream check valve 30 and a second, downstream check valve 32, which are respectively positioned adjacent an upstream edge 34 and a downstream edge 36 of lateral opening 28. A spacer 37 holds check valves 30, 32 apart and in place against edges 34, 36 of lateral opening 28, as seen most clearly in FIG. 2. Upstream check valve 30 includes a stop or lip 38 which abuts spacer 37 and upstream edge 34 of lateral opening 28, and downstream check valve 32 similarly includes a stop or lip 39 which abuts spacer 37 and downstream edge 36 of lateral opening 28. When sleeve 14 is positioned over lateral opening, the check valves 30, 32 and spacer 37 are covered by sleeve 14. Preferably, a notch 40 is provided in stop 39, and a corresponding protrusion 41 is provided on spacer 37, to facilitate the alignment and positioning of spacer 37 between check valves 30, 32.

The backflow preventer 10 includes a hand-actuated vent element 42. When sleeve 14 is positioned to cover lateral opening 28 in housing 12, means for fastening sleeve 14 in place are provided by a hand actuated vent element 42, which includes a threaded section 44 (FIG. 2) and an inner end 46. Sleeve 14 includes an internally threaded coupling element 48 located on the top of sleeve 14, that communicates with an internally threaded bore 50 which extends through sleeve 14. Spacer 38 also includes a bore 52 which extends therethrough, and when sleeve 14 is properly positioned over spacer 38 the bore 50 in sleeve 14 is aligned with the bore 52 in spacer. When thus aligned, the threaded portion of vent 42 can threadably engage coupling element 48 and bore 50 in sleeve 14, with the end 46 of vent 42 fitting into opening 52 in spacer 38 to hold sleeve 14 in place over lateral opening 28.

The internally threaded coupling element 48 on top of sleeve 14 is joined to a compression band 54 which extends circumferentially around sleeve 14. An externally threaded bolt 56 on the bottom of sleeve 14 is configured to receive a corresponding nut (not shown) which may be tightened onto bolt 56 to tighten compression band 54. Sleeve also preferably includes lips or flanges 58, 60 respectively adjacent to the upstream and downstream ends 62, 64 of sleeve 14 to facilitate hand manipulation of sleeve 14.

Figure 7:
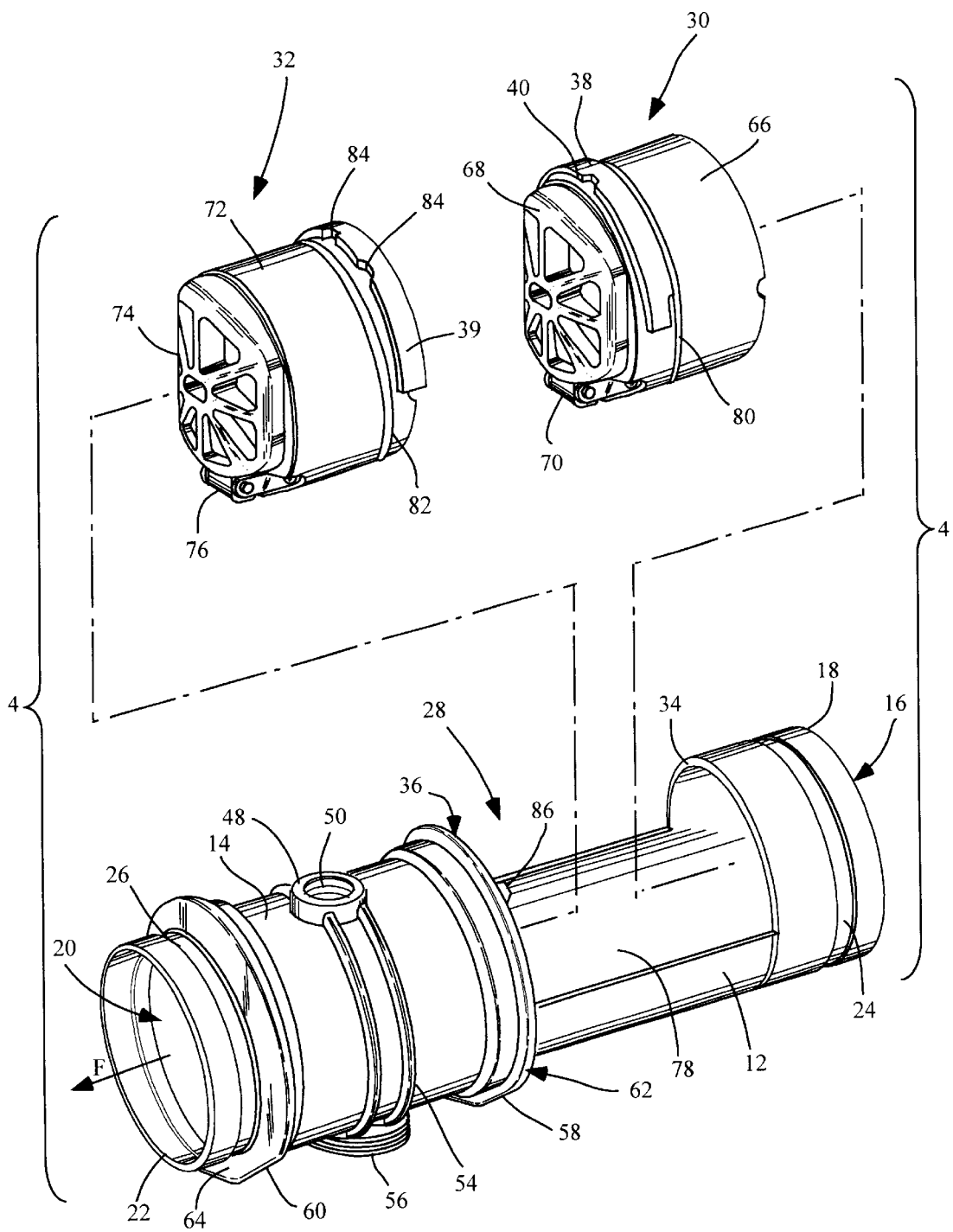
FIG. 7 is a partially exploded perspective view of the backflow prevention apparatus of FIG. 1.
Figure 8:
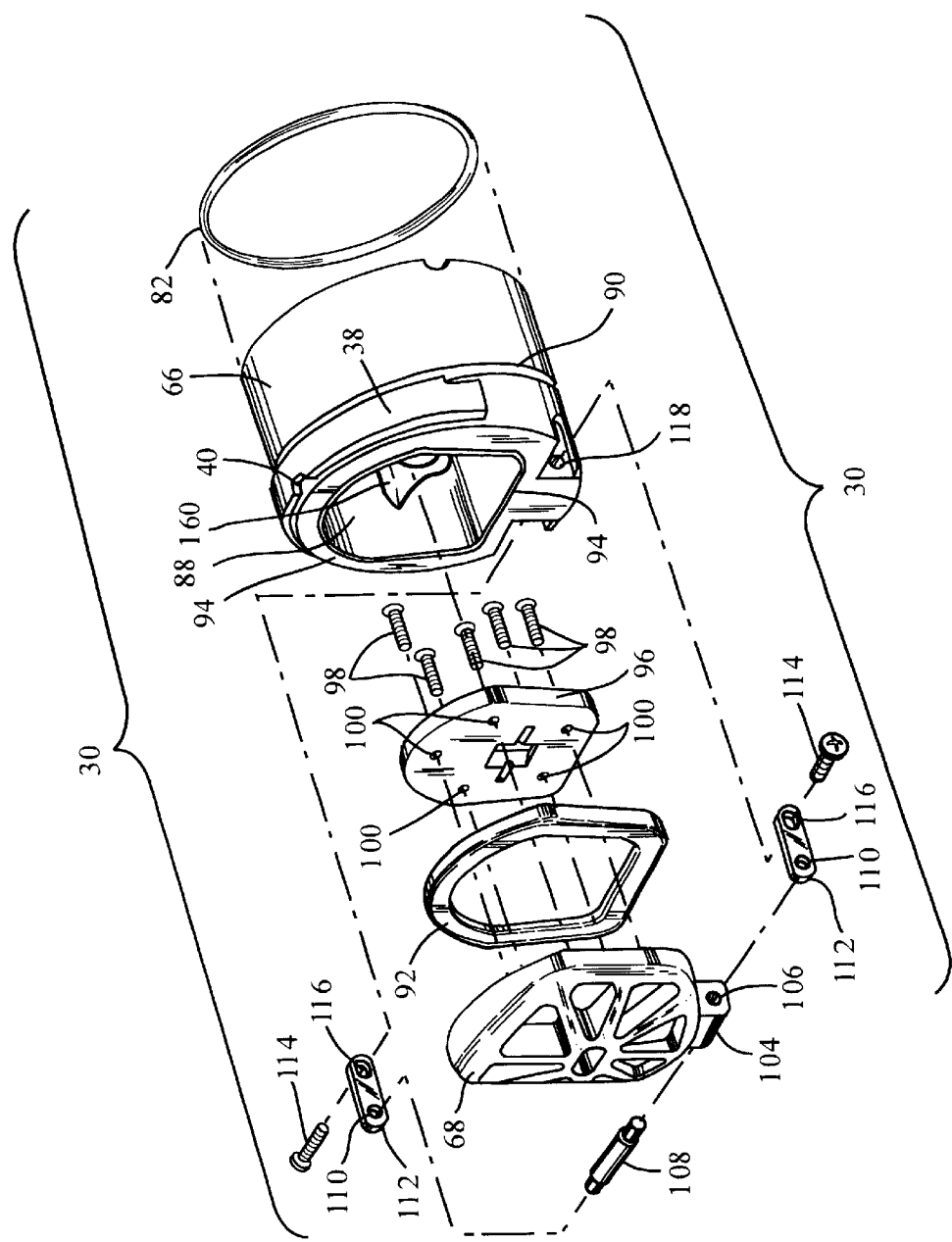
FIG. 8 is a partially exploded view of the downstream check valve.
Figure 9:
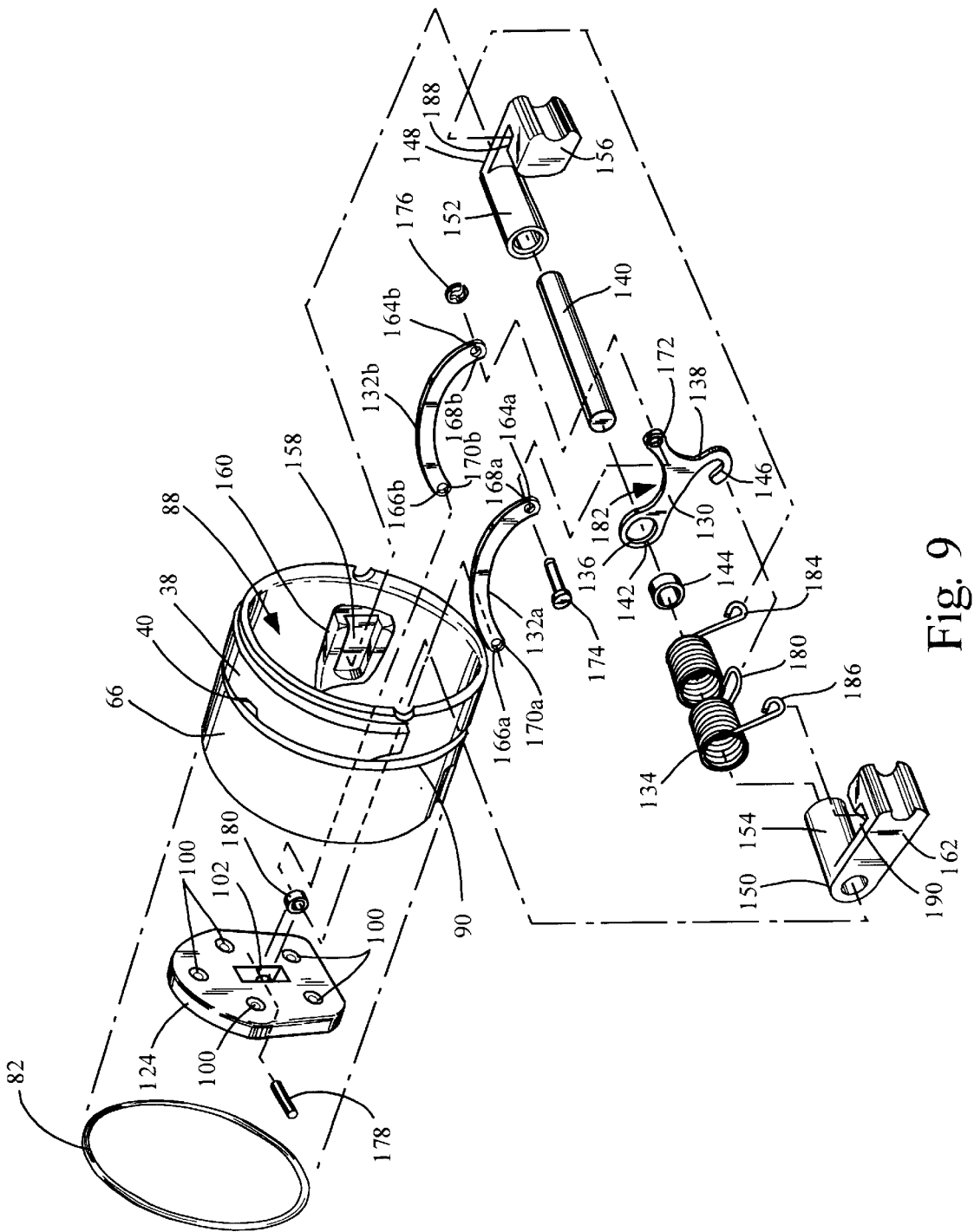
FIG. 9 is a partially exploded view of the upstream check valve showing the closure mechanism exploded.

Referring more particularly to FIG. 7 through FIG. 9, upstream check valve 30 includes generally a valve seat 66 and a clapper 68 pivotally coupled to the valve seat 66 by a hinge element 70. Downstream check valve 32 likewise: includes a valve seat 72 with a clapper 74 pivotally coupled thereto by a hinge element 76. Preferably, clappers 68, 74 are hinged to their respective valve seats 66, 72 proximate to the bottom edge thereof. Clappers 68, 74 and valve seats 66, 72 are preferably structured and configured such that clappers 68, 74 can open to relatively wide angle with respect seats 66, 72.

Valve seats 66, 72 are annular in shape and have external surfaces which are structured and configured such that valve seats 66, 72 are slidably received by the internal bore 78 of valve housing 12. Valve seat 66 includes an annular seal or o-ring 80 which is structured and configured to sealingly engage valve housing 12 when valve seat 66 is positioned within the bore 78 of housing 12. Valve seat 72 likewise includes an annular seal or, o-ring 82 which sealingly engages housing 12 when valve seat 72 is engaged in bore 78. The lip or stop 39 on valve seat 72 preferably includes notches 84 which are structured and configured to engage corresponding protrusions 86 on upstream edge 36 of lateral opening 28, to ensure that check valve 32 is properly positioned when valve seat 72 engages the bore 78 of housing 12. Check valve 30 includes a notch 40 on stop 38 which accommodates a corresponding protrusion 41, to provide for alignment of check valve 30, as noted above.

Referring also to FIG. 8, the valve seat 66 includes an internal flow path or fluid channel 88 which is generally contiguous with the flow path F of valve housing 12 when check valve 30 is positioned, within the bore 78 of valve housing 12. An annular groove 90 extends circumferentially around the outer surface of valve seat 66 to accommodate seal 82.

Clapper 68 includes an annular seal 92 which is structured and configured to engage a corresponding annular lip 94 on valve seat 66. Seal 92 is mounted on clapper 68 by a back plate 96 and screws 98 which extend through holes 100 in back plate and engage corresponding threaded holes (not shown) in clapper 74. Back plate 98 includes a slot 102 for pivotal coupling to a clapper closure mechanism described further below.

Clapper 68 includes a gudgeon 104 having a bore 106 which rotatably receives a pintle 108. The ends of pintle 108 are received by holes 110 in fasteners 112. Screws 114 extend through holes 116 in fasteners 112 and engage corresponding bores 118 in valve seat 72, so that clapper 74 is pivotally coupled to valve seat 72. As shown, clapper 68 is pivotally coupled to valve seat 66 generally proximate to the bottom or lower edge of the valve seat 66. In other embodiments of the invention, clapper 68 may be pivotally mounted at the top edge of seat 66, or at the sides of seat 66.

The arrangement of clapper 74 on valve seat 72 of check valve 32 is generally identical to that described above and shown in FIG. 8 for clapper 66 and check valve 68. Thus, as shown in FIG. 10 through FIG. 13, valve seat 72 defines an annular flow path or fluid channel 120, and includes an annular lip 121 that engages a corresponding annular seal 122, with seal 122 mounted on clapper 74 by a back plate 124 and screws 126 in generally the same manner as shown in FIG. 8. The hinge assembly 76 (FIG. 7) of check valve 32 is the same as hinge assembly 70 of check valve 30, and includes a pintle and gudgeon arrangement which is the same as that shown in FIG. 8. The interiors of valve seats 66, 72 are preferably tapered in shape such that flow paths 88, 120 have a venturi shape, as seen most clearly in FIG. 10 through FIG. 13.

Referring now more particularly to FIG. 9, an exploded view of a valve closure mechanism 128 for check valve 30 is shown. The closure mechanism 128 comprises generally a first linkage arm or closure element 130, a second linkage arm or closure element provided by linkage members 132a, 132b, and a bias element which is provided by a spring 134. First closure element 130 includes a first end 136 and a second end 138, and closure element 130 is pivotally mounted on a rod 140 at its first end 136. Rod 140 extends through a hole 142 in the end 136 of closure element 130 and is accommodated by a sleeve 144, which also fits within hole 142. Preferably, a hook 146 is provided on linkage element 130 proximate the second end 138, and is used to hold the clapper 68 of check valve 30 open during maintenance operations, as related further below.

Rod 140 extends across the flow path 88 of valve seat 66. A pair of holders 148, 150 are provided, with holders including sleeves 152, 154 respectively which are structured and configured to accommodate rod 140. Holder 148 includes a coupling element 156 which engages or snap-fits into the slot 158 of a mounting element 160 positioned on the inner surface of valve seat 66. Holder 150 likewise includes a coupling element 162 which engages or snap fits into the slot of a corresponding mounting element (not shown) which is located generally opposite mounting element 160 on the inner surface of valve seat 66.

The members 132a, 132b which provide the second closure element preferably are elongated in shape, with member 132a including a first end 164a and a second end 166a, and with member 132b including a first end 164b and a second end 166b. Linkage member 132a includes a hole 168a adjacent first end 164a and a hole 170a adjacent second end 166a. Linkage member 132b likewise includes a hole 168b adjacent first end 164b, and a hole 170b adjacent second end 166b. The first ends 164a, 164b of linkage members 132a, 132b are pivotally coupled to the second end 138 of first linkage element 130. In this regard, a hole 172 is included proximate the second end 138 of linkage element 138, and a pin 174 extends through holes 168a, 168b in the ends 164a, 164b of linkage members 132a, 132b, as well as through hole 172 in end 138 of linkage element 130, in order to pivotally link members 132a, 132b and element 130 together. The end of pin 174 engages a ferrule 176, which holds the assembled members 132a, 132b and element 130 together on pin 174. The end 138 of linkage element 130 is positioned between the ends 164a, 164b of members 132a, 132b, when pivotally assembled on pin 174.

The second ends 166a, 166b of linkage members 132a, 132b are pivotally coupled to the back plate 124 of clapper 68 (FIG. 8). A pin 178 extends through holes 170a, 170b in ends 166a, 166b of linkage elements 132a, 132b, and the ends of pin engage slot 102 in back plate 124, in order to pivotally link elements 132a, 132b to back plate 124 and clapper 68. Pin 178 also extends through a washer 180, which is positioned between the ends 166a, 166b of members 132a, 132b.

Spring 134 preferably is mounted about rod 140 and is structured, configured and positioned to bias first linkage element 130 such that a closure force is exerted on clapper 66 via linkage element 130 and pivotally linked members 132a, 132b. To this effect, spring 134 includes a central protruding loop 180 which engages a saddle 182 on linkage element 130, such that the bias of spring 134 is applied to linkage element 130 via loop 180. Spring 134 includes ends 184, 186 which are retained in recesses 188, 190 respectively of holders 148, 150, so that spring is maintained in place on rod 140.

Check valve 32 includes a closure mechanism which is generally identical to the closure mechanism or assembly 128 of check valve 30 as shown in FIG. 8. An exploded view of the identical closure mechanism of check valve 32 has been omitted order to avoid over-complication of this disclosure. Referring to FIG. 10 through FIG. 13, the closure mechanism 192 for check valve 32 includes a first linkage or closure element 194 pivotally coupled to a rod 196, and a second linkage or closure element 198 which is pivotally coupled to first closure element 194 by pin 200, and which is pivotally coupled to back plate 124 of clapper 74 by a pin 202 which is mounted in a slot 204 in back plate 124. A spring 206 is mounted on rod 196 and configured to bias first linkage element 194 in the manner described above. Rod 196 extends across the flow path 120 of valve seat 72, and is mounted thereon by holders 208 which engage mounting elements 210 on the inner surface of valve seat 72 as related above.

The second closure element 198 is preferably split or bifurcated into dual linkage members positioned on opposite sides of first closure element 194, in the same manner as linkage members 132a, 132b shown in FIG. 8. For reason of clarity, however, only a single second linkage element 198 is shown in FIG. 10 through FIG. 13. Likewise, for reason of clarity, the dual linkage members 132a, 132b of FIG. 8 are shown generally as a single second linkage element 132 in FIG. 10 through FIG. 13. Preferably, first linkage elements 130, 194, and second linkage elements 132, 198 are elongated in shape, with second linkage elements 132, 198 being generally longer than first linkage elements 130, 194. Second linkage elements 132, 198, in the preferred embodiments, are curved or arcuate in shape.

In the operation of check valve 30 during the opening and closing of clapper 68 with respect to valve seat 66, first closure element 130 pivots about rod 140, while first and second closure elements 130, 132 pivot about the pin 174 which pivotally links first and second closure elements 130, 132, and clapper 68 and second closure element 132 pivot about the pin 178. Clapper 68, is pivotally coupled to seat 66 via hinge 70, as noted above. Thus, rod 140 serves as a first pivot point about which first closure element rotatably moves, while pin 174 serves as a second pivot point about which first and second closure elements 130, 132 rotatably move, and pin 178 serves as a third pivot point about which second linkage closure 132 and clapper 68. rotatably move. In the preferred embodiments, the first pivot point as defined by rod 140 is located at a point. which is upstream from the seal 92 associated with clapper 68 and seat 66. That is, the first pivot point is positioned closer to the upstream edge 212 of valve seat 66 than is seal 92.

Similarly, during operation of check valve 32, first closure element 194 pivots about rod 196, while first and second closure elements 194, 198 pivot about pin 200, and clapper 74 and second closure element 198 pivot about pin 202. Thus, for closure assembly 192, rod 196 serves as a first pivot point, with pin 200 serving as a second pivot point, and pin 202 serves as a third pivot point. The first pivot point defined by rod 196 again is preferably located at a position which is upstream relative to seal 122, such that rod 196 is positioned closer to the upstream edge 213 of valve seat 72 than is seal 122.

The nature of the operation of the closure mechanisms or assemblies 128, 192 of check valves 30, 32, as shown in FIG. 10 through FIG. 13, will be more fully understood in terms of linkage deflection L and moment arm M. Linkage deflection L, for check valve 30, is generally defined as the angle between the first pivot point provided by rod 140 and the second pivot point provided by pin 174. Moment arm M is defined generally as the distance between a line intersecting the pivot points defined by pins 174 and 178, and a parallel line which passes through the pivot point defined by rod 140. In check valve 32, the linkage deflection L is defined by the angle between the pivot points provided by rod 196 and pin 200, and the moment arm M is defined by the distance between the line intersecting the pivot points provided by pins 200, 202, and a parallel line which intersects the pivot point provided by rod 196.

Since the closure mechanisms 128, 192 for check valves 30, 32 are generally identical, linkage deflection L for both closure mechanisms 128, 192 is shown only for check valve 30, while the moment arm M for both closure mechanisms 128, 192 is shown only for check valve 32, in order to avoid over complication of FIG. 10 through FIG. 13. It should be understood that the linkage deflection L and moment arm M for each closure mechanism 128, 192 is generally the same.

Figure 10:
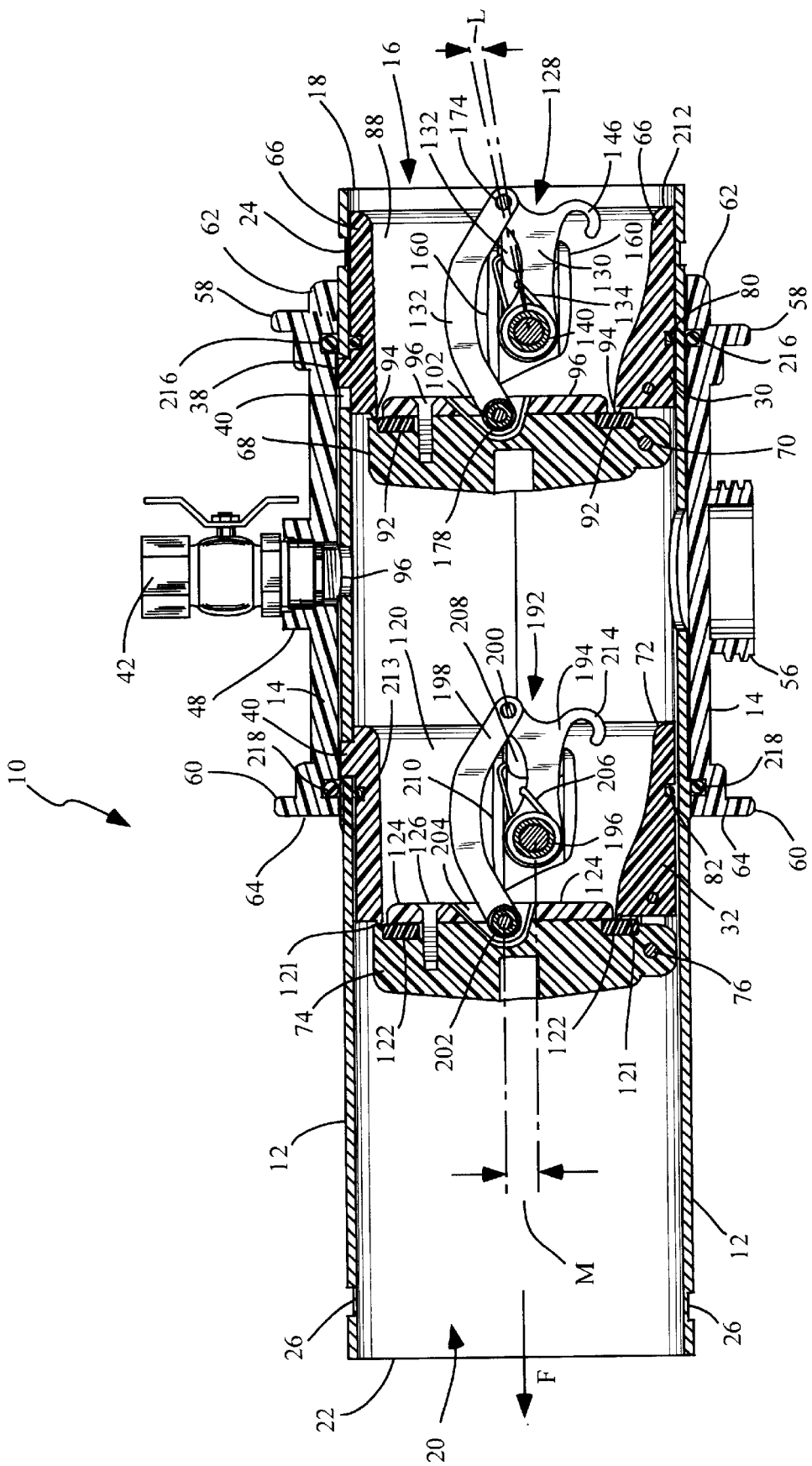
FIG. 10 is a partial cross-sectional view of the backflow prevention apparatus of FIG. 1 shown through line 10—10.
Figure 11:
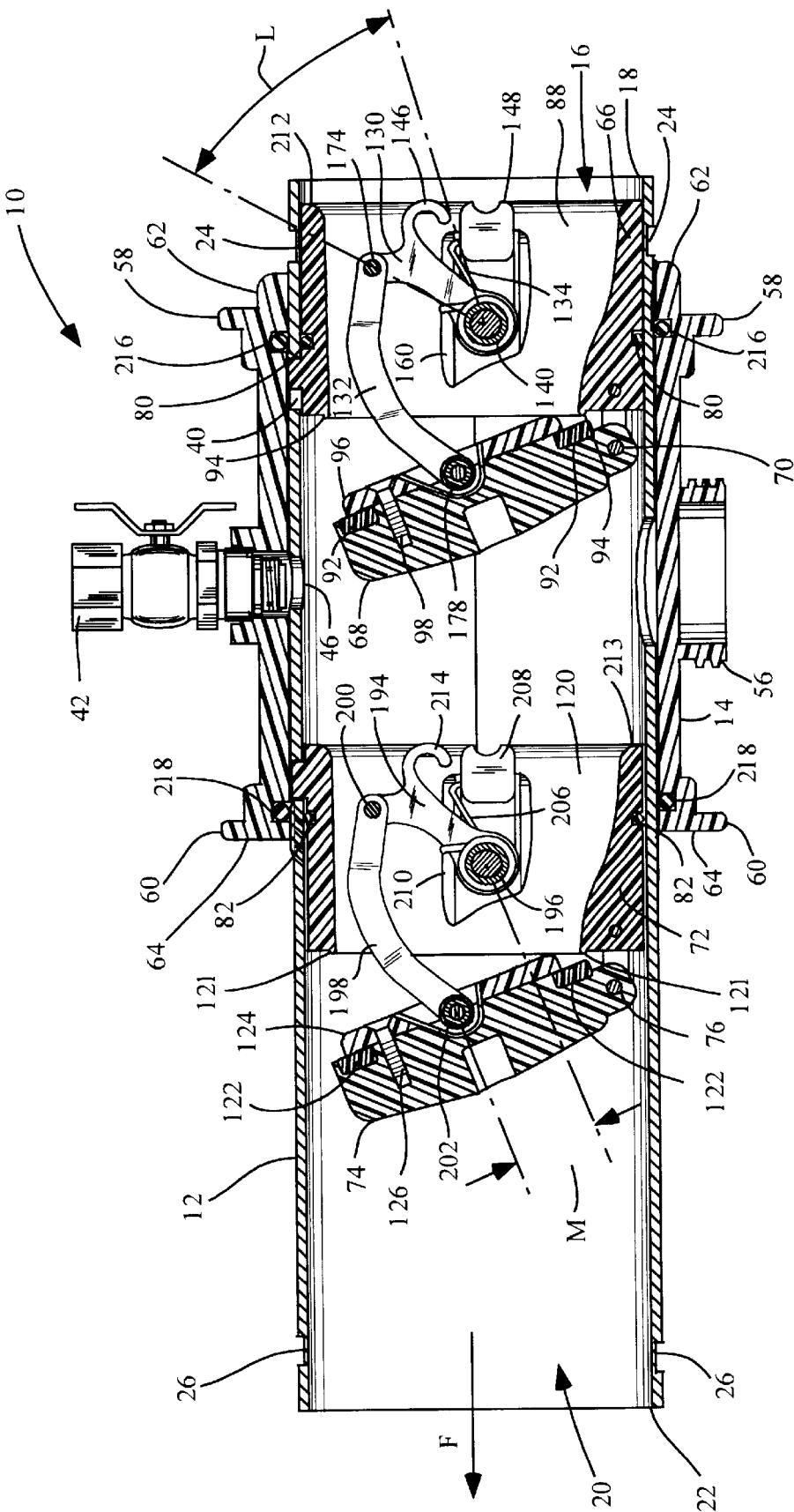
FIG. 11 is a partial cross-sectional view of the backflow prevention apparatus of FIG. 10 shown with the check valve clappers partially open to an angle of approximately 25 degrees.
Figure 12:
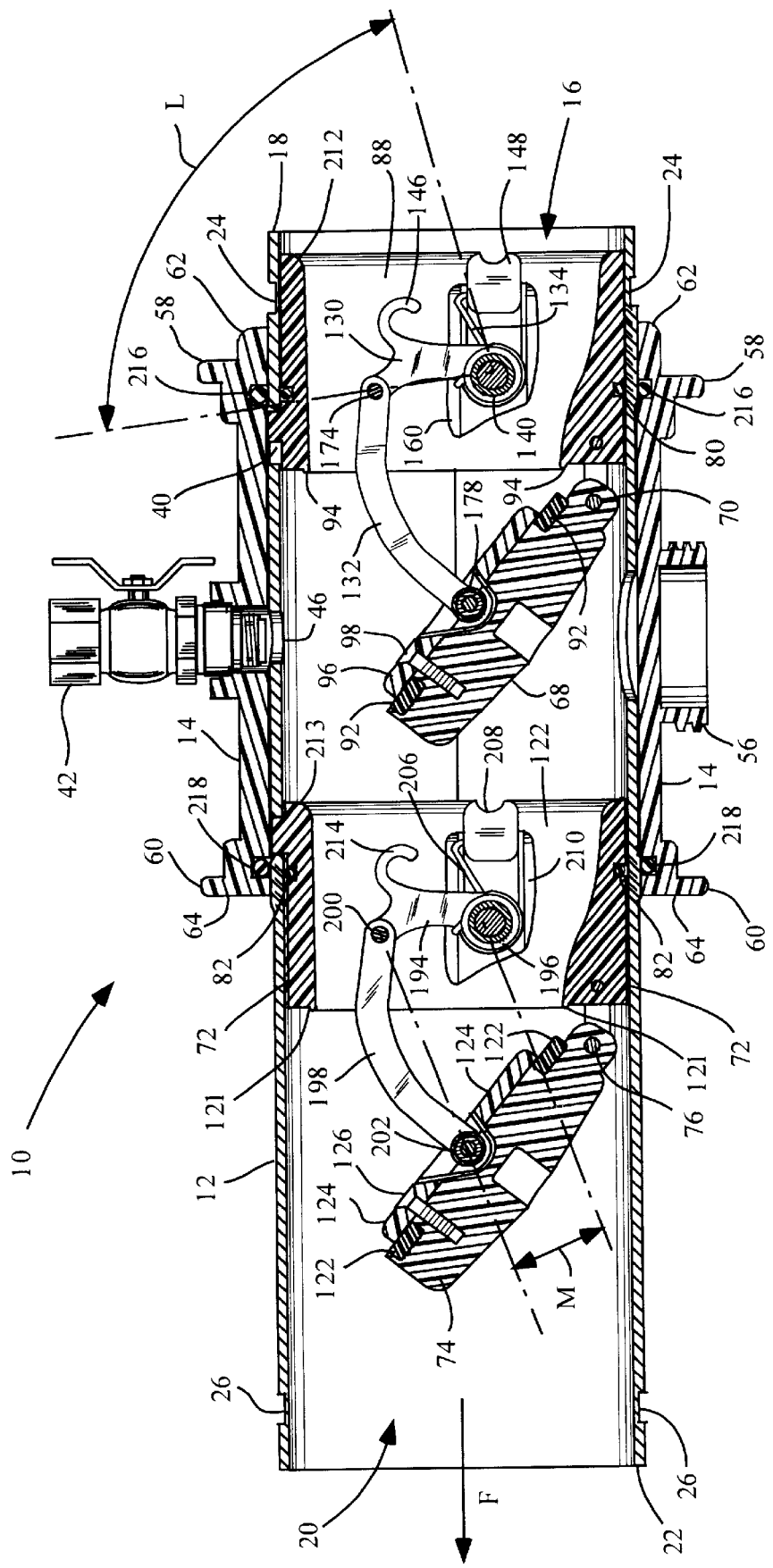
FIG. 12 is a partial cross-sectional view of the backflow prevention apparatus of FIG. 10 shown with the check valve clappers partially open at an angle of approximately sixty degrees.
Figure 13:
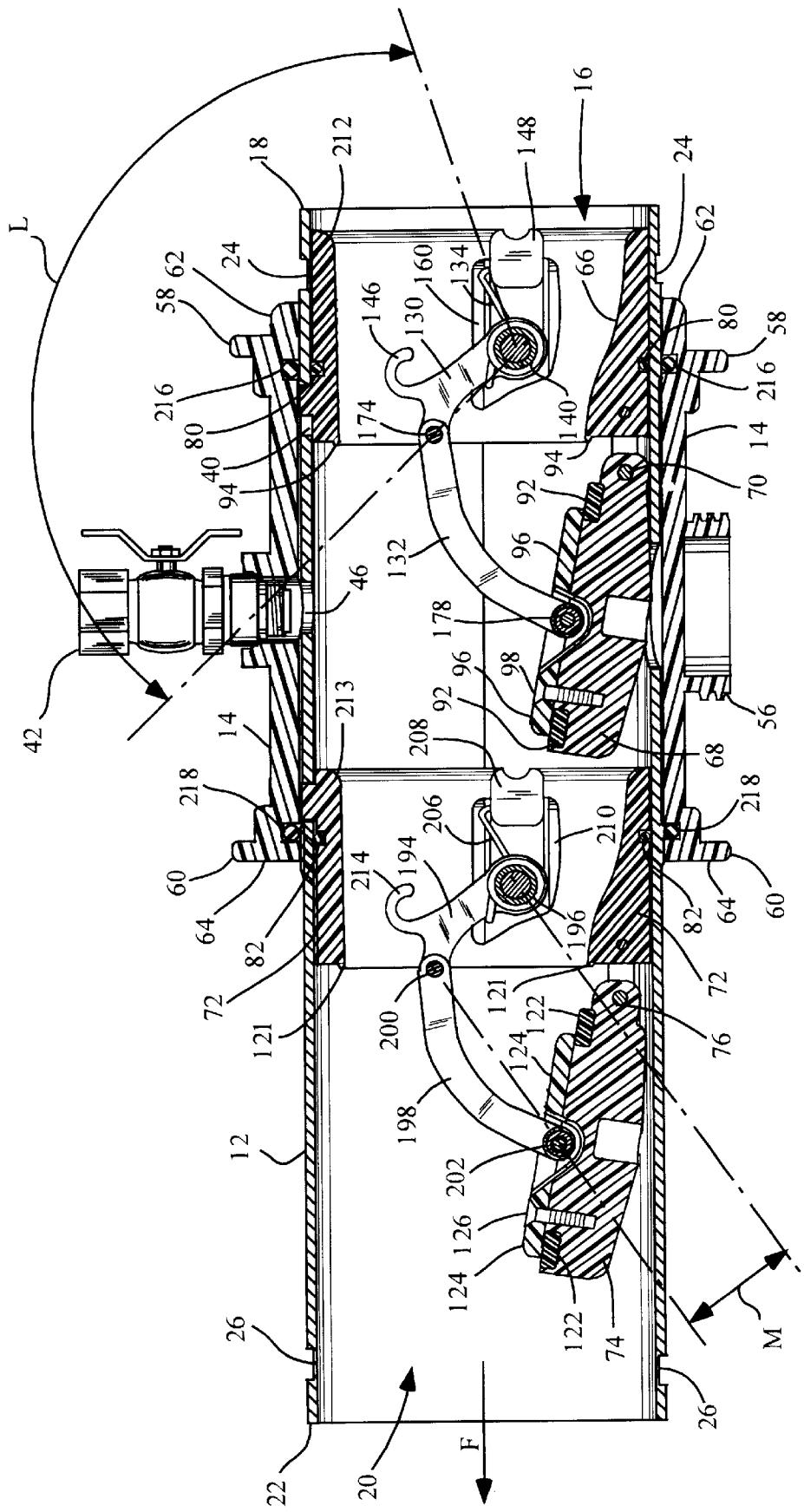
FIG. 13 is a partial cross-sectional view of the backflow prevention apparatus of FIG. 10 shown with the check valve clappers fully open.

FIG. 10 shows clappers 68, 74 of check valves in fully closed positions, such that seals 92, 122, engage lips 94, 121 on valves seats 66, 72 respectively. FIG. 10 represents a static condition for the backflow preventer 10 wherein no fluid flow through backflow preventer 10 occurs. In FIG. 11, clappers 68, 74 are shown as partially open with respect to valve seats 66, 72, such that fluid flow, in the direction of flow stream F, will occur, with fluid moving from the upstream end 18 to the downstream end 22 of housing 12. FIG. 12 shows clappers 68, 74 more fully open, in a position which allows greater fluid flow along flow stream F. FIG. 13 shows clappers 68, 74 in a fully open position as occurs under maximum flow conditions.

Referring now to Table 1, there is shown a specific example for the closure mechanisms 128, 192 and check valves 30, 32 of the invention. The details of the example of Table 1 represent one preferred configuration for use with backflow preventer 10 when configured with valve housing having a four inch internal diameter in accordance with USC guidelines. The USC guidelines for double check valve backflow prevention devices are well known in the art and are described in the USC "Manual of Cross-Connection Control", published periodically by the University of Southern California Foundation for Cross-Connection Control and Hydraulic Research, published by University of Southern California, Los Angeles, Calif., 1993, the disclosure of which is incorporated herein by reference. Table 1 illustrates specific properties for springs 134, 206, first closure members 130, 194, second closure members 132, 198, and the static seal area for check valves 30, 32, for one specific preferred embodiment of the invention.

TABLE 1

| Parameters Using Double Torsion Spring with Round Wire | Parameter Value | Units |
|---|---|---|
| Spring Wire Diameter | 0.100 | Inches |
| Inside Diameter of Coils | 1.125 | Inches |
| Deflection | 530 | Degrees |
| Number of Body Coils | 14.590 | # |
| 2nd Closure Arm Length | 1.000 | Inches |
| 1st Closure Arm Length | 0.750 | Inches |
| Coil Spacing | 0.010 | Inches |
| Modulus of Elasticity | 29500000 | Psi |
| Mean Diameter | 1.225 | Inches |
| Active Body Turns | 15.045 | # |
| ID of Coils After Deflection | 1.022 | Inches |
| Body Length | 1.852 | Inches |
| Spring Index | 12.250 | # |
| ID Stress Correction Factor | 1.067 | # |
| Spring Rate | 14.8 | lbs/360 deg |
| Spring Stress | 237072 | psi |
| Static Seal Area of Check | 16.400 | sq-in |

It should be kept in mind that the particular details shown in Table 1 are only exemplary, and the particular dimensions and properties of the various components of backflow preventer 10 will generally vary according to particular uses of the invention. Thus, the particular details of Table 1 should not be considered limiting.

Table 2 illustrates several properties for check valves 30, 32 according to the specific example provided in Table 1. Table 2 includes the linkage deflection L and moment arm M for closure mechanisms 128, 192 as described above. Table 2 also provides the spring deflection angle for springs 134, 206, linear closure force exerted on clappers 68, 74, and theoretical differential pressure for check valves 30, 32, for different clapper angles. The clapper angles of Table 2 approximate the clapper angles shown in FIG. 10 through FIG. 13, with FIG. 10 corresponding to sealed clappers (zero degrees), FIG. 11 corresponding to clapper angle 2, FIG. 12 corresponding to clapper angle 3 (maximum moment arm M), and FIG. 13 corresponding to the fully open clapper angle (approximately eighty three degrees).

TABLE 2

| | Clapper Angle (degrees) | Spring Deflection (degrees) | Linkage Deflection (degrees) | Linear Force (lbs) | Theoretical Differential (psi) | Moment Arm (in) |
|---|---|---|---|---|---|---|
| Clapper Sealed Static Cond. | 0 | 400 | 0 | 26.518 | 3.234 | 0.621 |
| Clapper Angle 1 | 25 | 455 | 55 | 10.541 | 1.286 | 1.777 |
| Clapper Angle 2 | 60 | 503 | 103 | 8.679 | 1.058 | 2.386 |
| Clapper Angle @ Max Moment | 70 | 515 | 115 | 8.853 | 1.080 | 2.395 |
| Clapper Full Open | 83 | 530 | 130 | 9.438 | 1.151 | 2.312 |

Figure 14:
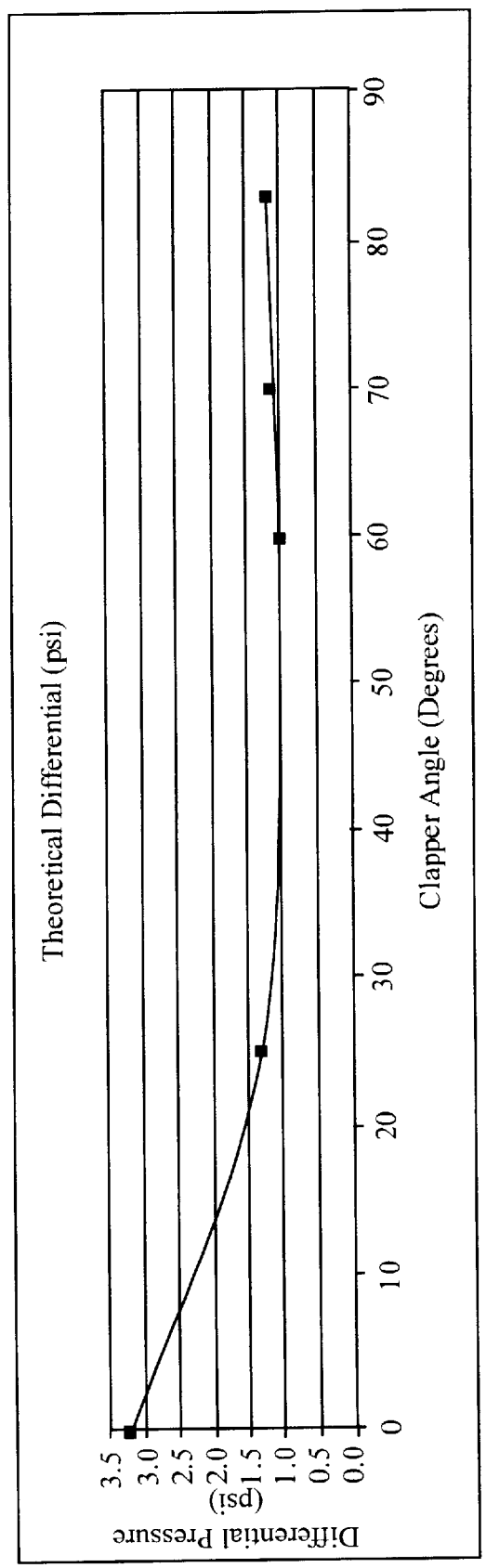
FIG. 14 is a graphical representation of differential pressure versus clapper angle for the backflow prevention apparatus of the invention as embodied in the specific example shown in Table 1.

The change in theoretical differential pressure versus clapper angle for check valves 30, 32 according to the specific example of Table 1 is shown graphically in FIG. 14. The change in linear force versus clapper angle according to the specific example of Table 1 is shown graphically in FIG. 15. The change in linkage deflection versus clapper angle according to the specific example of Table 1 is shown graphically in FIG. 16. The change in moment arm M versus clapper angle according to the specific example of Table 1 is shown graphically in FIG. 17.

Figure 15:
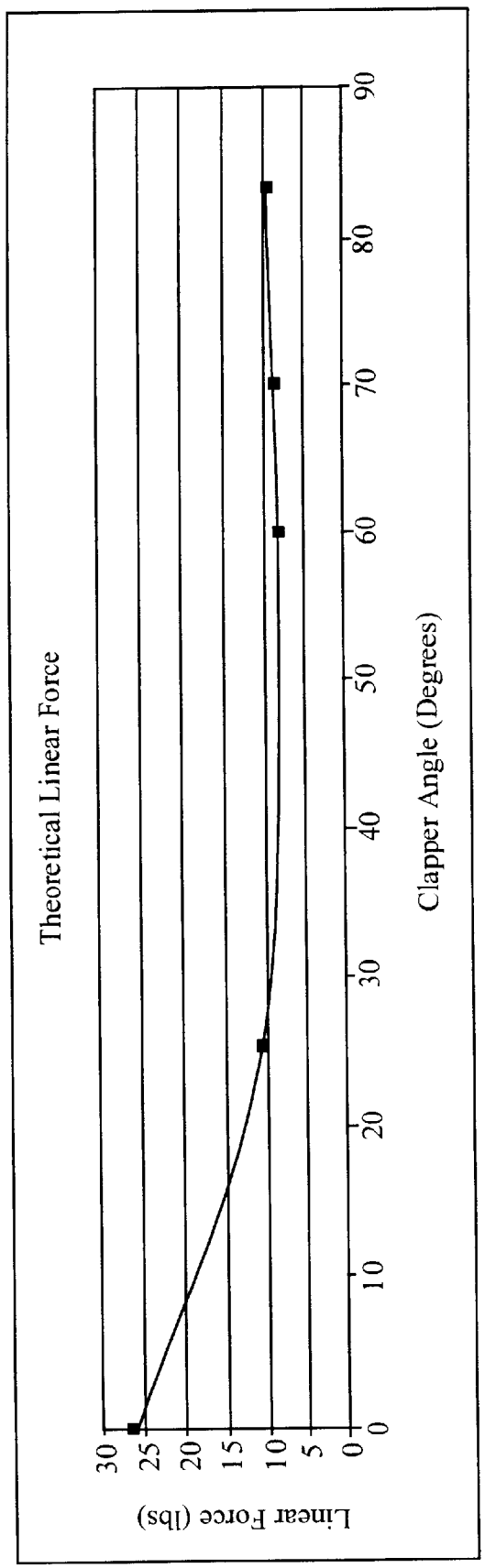
FIG. 15 is a graphical representation of linear closure force versus clapper angle for the backflow prevention apparatus of the invention as embodied in the specific example shown in Table 1.
Figure 16:
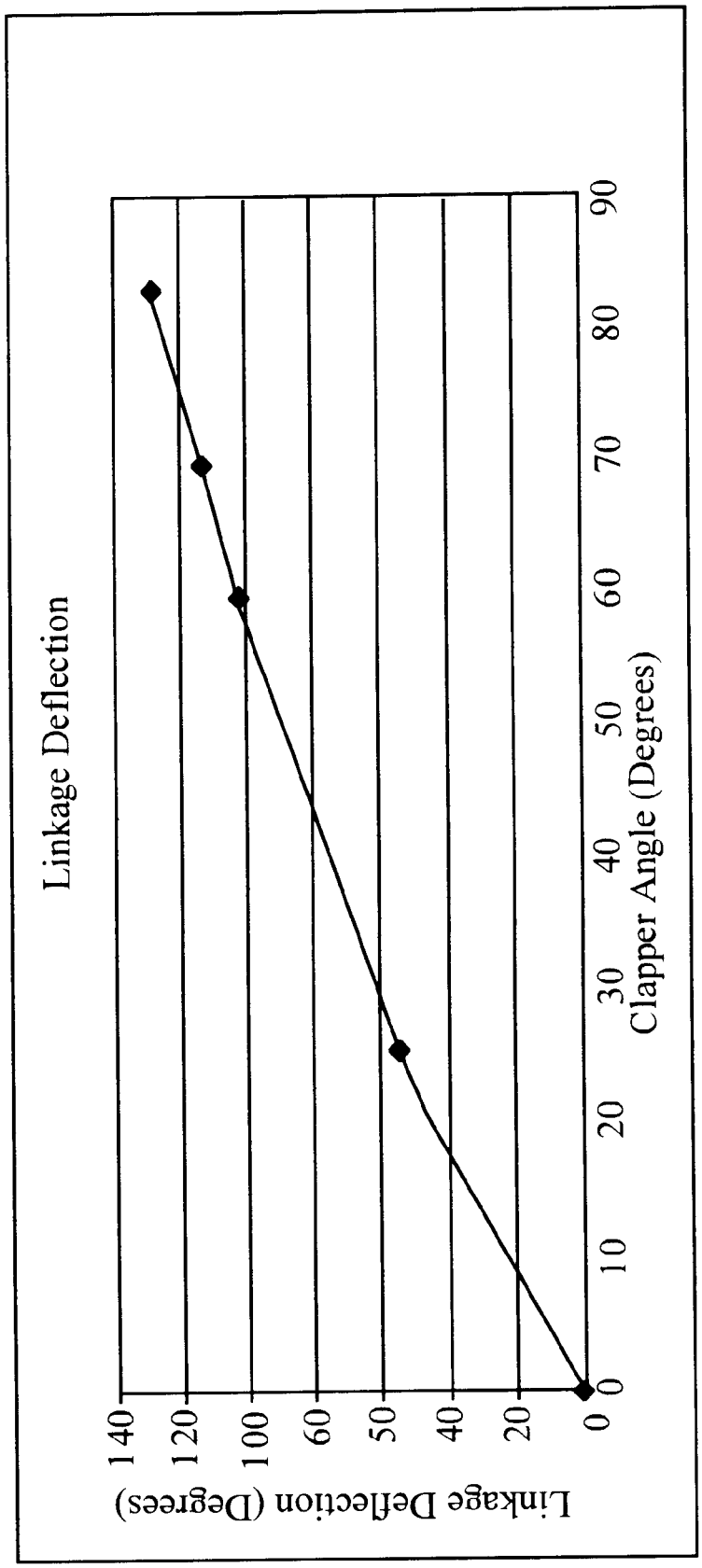
FIG. 16 is a graphical representation of linkage deflection versus clapper angle for the backflow prevention apparatus of the invention as embodied in the specific example shown in Table 1.
Figure 17:
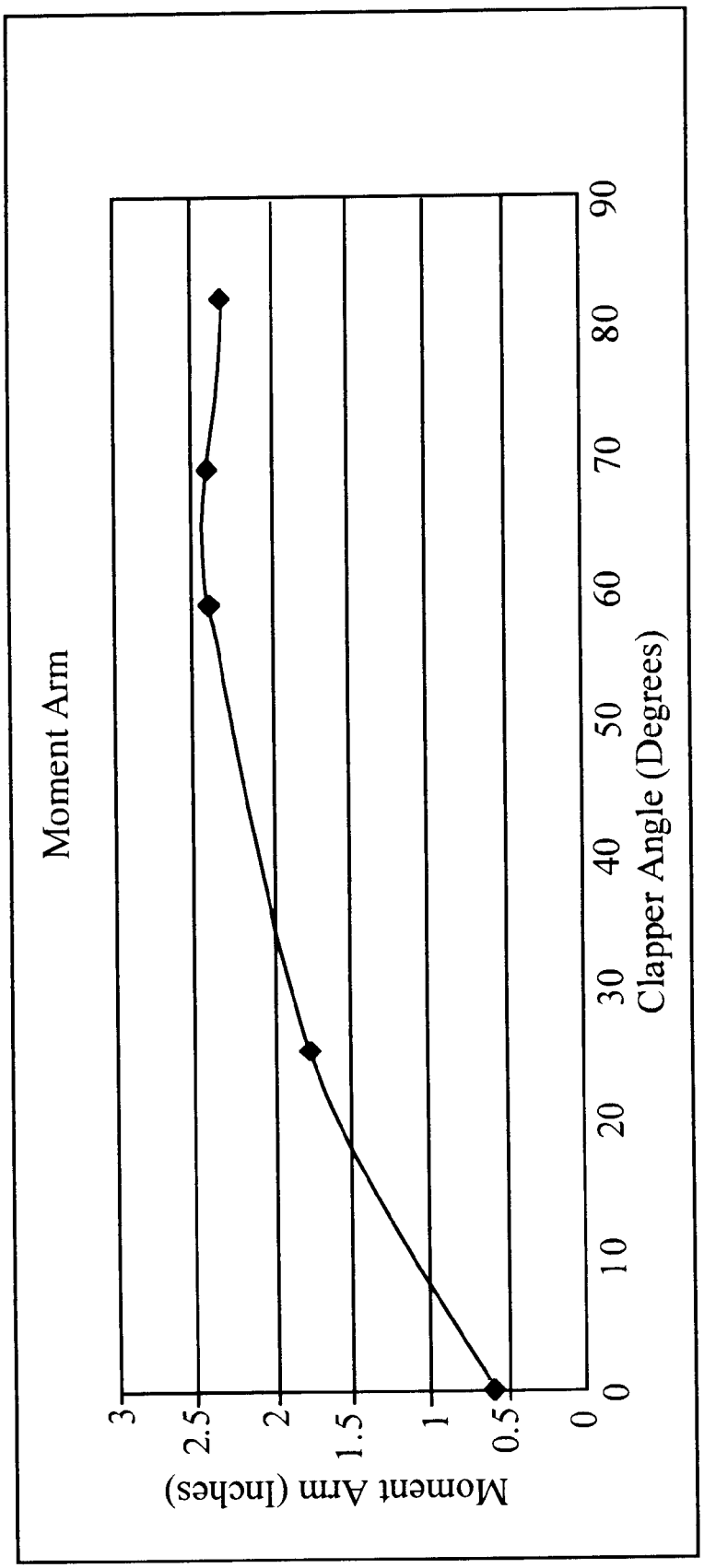
FIG. 17 is a graphical representation of moment arm dimension versus clapper angle for the backflow prevention apparatus of the invention as embodied in the specific example shown in Table 1.
Figure 18:
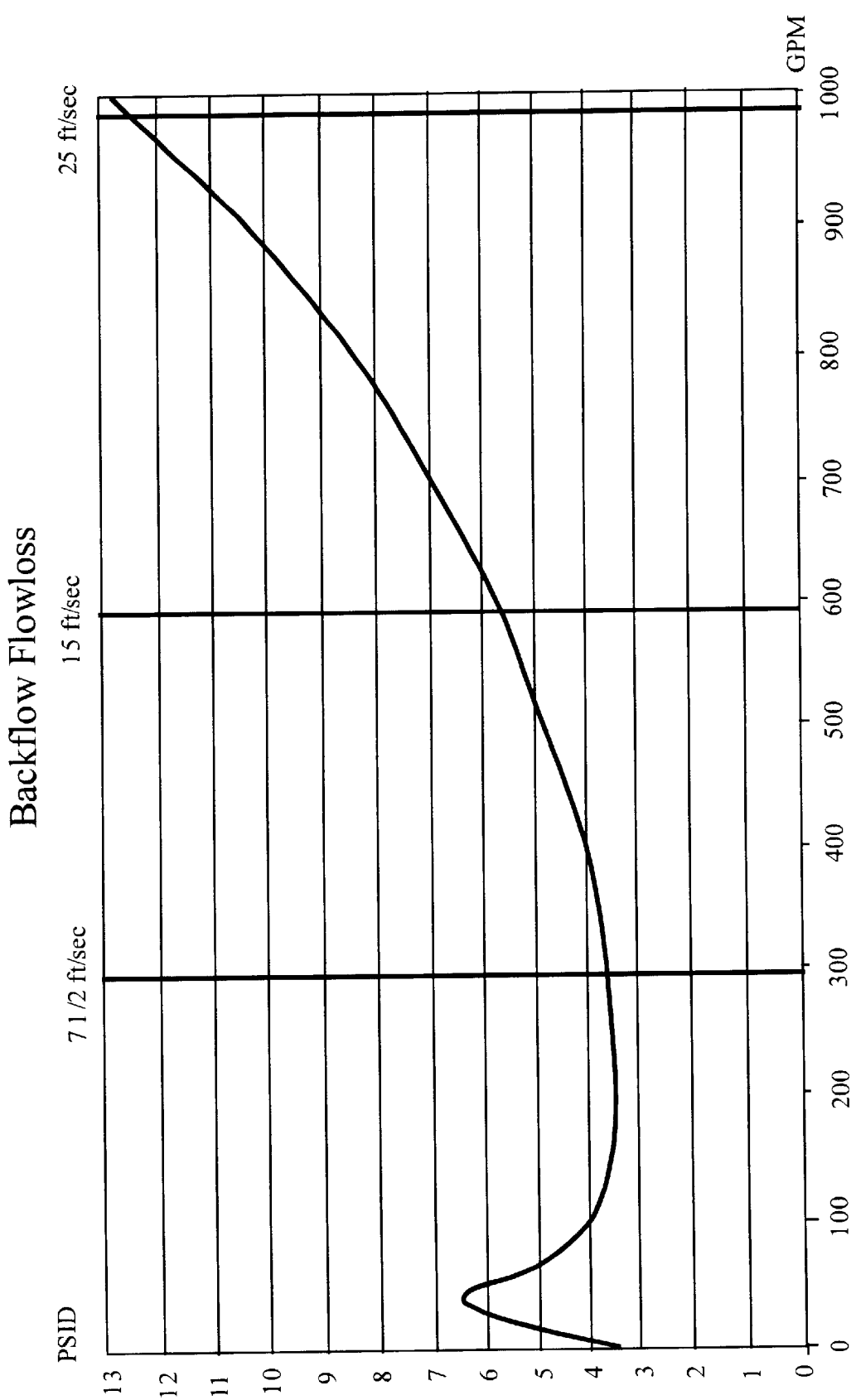
FIG. 18 is a graphical representation of relative flow loss for the backflow prevention apparatus of the invention as embodied in the specific example shown in Table 1 shown as pressure versus fluid flow rate.

As can be seen from Table 2 and FIG. 14 through FIG. 17, the closure mechanisms 128, 192 and check valves 30, 32 of the invention advantageously provide low flow losses, and provide a small positive pressure differential for the apparatus 10 under static flow conditions. In the operation of closure mechanisms, 128, 192, as clappers 68, 74 open, the first closure elements 130, 194 separate or spread apart from second closure elements 132, 198 at pivot points 174, 200 respectively. The linkage deflection L increases in a substantially linear fashion as clappers 68, 74 open, as can be seen in FIG. 16 and Table 2. As seen in FIG. 17 and Table 2, the moment arm M initially increases in a somewhat nonlinear fashion, such that the rate of increase in the dimension of moment arm M is greater during the initial opening of clappers 68, 74, with the rate of increase of M decreasing as clappers 68, 74 approach a maximum moment arm M value, after which the value of M decreases slightly as the clappers 68, 74 become fully open. The theoretical linear force which effects the closure of clappers 68, 74, is nonlinear with respect to clapper angle, and is relatively high as clappers 68, 74 initially open, and then decreases and levels off as clappers 68, 70 open at an angle greater than thirty degrees, as shown in FIG. 15 and Table 2. Theoretical differential pressure likewise is nonlinear with respect to clapper angle as shown in FIG. 14, and decreases as clappers initially open, and levels off as angles of thirty degrees and greater are reached. FIG. 18 illustrates relative flow loss in PSID versus flow rate in gallons per minute, for a four inch backflow preventer 10 according to the specific example.

The backflow prevention apparatus 10 is preferably modular in nature and is quickly and easily assembled. In assembling the backflow preventer 10, sleeve 14 is slidably moved with respect to valve housing 12 so that lateral opening 28 in valve housing is exposed, as seen most clearly in FIG. 7. Check valve 32 is placed in lateral opening 28 and positioned within the bore 78 of housing 12, and check valve 32 is moved towards the downstream edge 36 of lateral opening, with valve seat 72 sliding downstream within bore 78 until stop 39 abuts or comes to rest against downstream edge 36 of lateral opening 28, as seen most clearly in FIG. 6 and FIG. 5. Protrusions 86 in downstream edge 36 engage corresponding notches in stop 39, so that check valve 32 is properly oriented. When thusly positioned, seal 82 is positioned to provide a fluid tight sealing relationship between valve seat 72 and valve housing 12.

In a similar fashion, check valve 30 is placed within lateral opening 28 and positioned within the bore 78 of housing, and check valve 30 is moved upstream, with valve seat 66 sliding upstream within bore 78, until stop 38 abuts or comes to rest against upstream edge 34 of lateral opening 28, as seen most clearly in FIG. 4 and FIG. 3. Spacer 37 is then positioned between the stops 38, 29 to hold check valves 30, 32 in place, as seen most clearly in FIG. 2 and FIG. 3. Spacer 37 includes a protrusion 41 which engages a corresponding notch 40 in stop 38, to ensure that spacer 37 is properly positioned. Once spacer 37 is thus positioned, sleeve 14 is slidably moved along valve body .12 until sleeve 14 covers lateral opening 28, spacer 37 and check valves 30, 32, with the bore 50 in sleeve 14 being aligned with bore 52 in spacer 37. Then, the end 46 of vent 42 is inserted through bores 50, 52, and the threaded portion 44 of vent 42 is engaged in the corresponding threaded section 48 on sleeve 14, to hold sleeve 14 in place on valve housing 12.

When the back flow preventer 10 undergoes maintenance, a user can access check valves 30, 32 by loosening and removing vent 42 from bores 52, 50, sliding sleeve 14 back to expose lateral opening 28, removing spacer 37, and then disengaging check valves 30, 32 from the bore 78 of valve housing. Hooks 146, 214 are provided on linkage elements 130, 194 respectively, so that when a user, during servicing check valves 30, 32, can position a screw driver or similar tool (not shown) within hooks 146, 214 to hold the screw driver against coupler 148, 208, so that clappers 68, 74 will be held open by the screw driver against the bias of springs 134, 206.

Referring again to FIG. 10 through FIG. 13, sleeve 14 includes a first annular seal 216 proximate to upstream edge 62 and a second annular seal 218 located proximate to downstream edge 64. Seals 216, 218 extend circumferentially around the inner surface of sleeve 14, and sealingly engage valve housing 12. Thus, when sleeve 14 is positioned. over lateral opening 28, sleeve 14 provides a fluid tight cover for lateral opening 28, and sleeve 14 and housing 12, together with seals 216, 218 define a complete, fluid tight valve body for the backflow apparatus 10.

Spacer 37 does not require use of any seals therewith, as spacer 37 is required only to hold check valves 30, 32 in their proper positions, and spacer 37 does not form part of the fluid tight cover provided by sleeve 14, or part of the fluid tight valve body defined by sleeve 14 and housing 12. The arcuate shape of spacer 37 generally matches the size and shape of lateral opening 28 because, during manufacture, the section of valve housing 12 which is cut away to form side opening 28 can conveniently be re-used as spacer 37, which reduces cost and manufacturing time.

Figure 19:
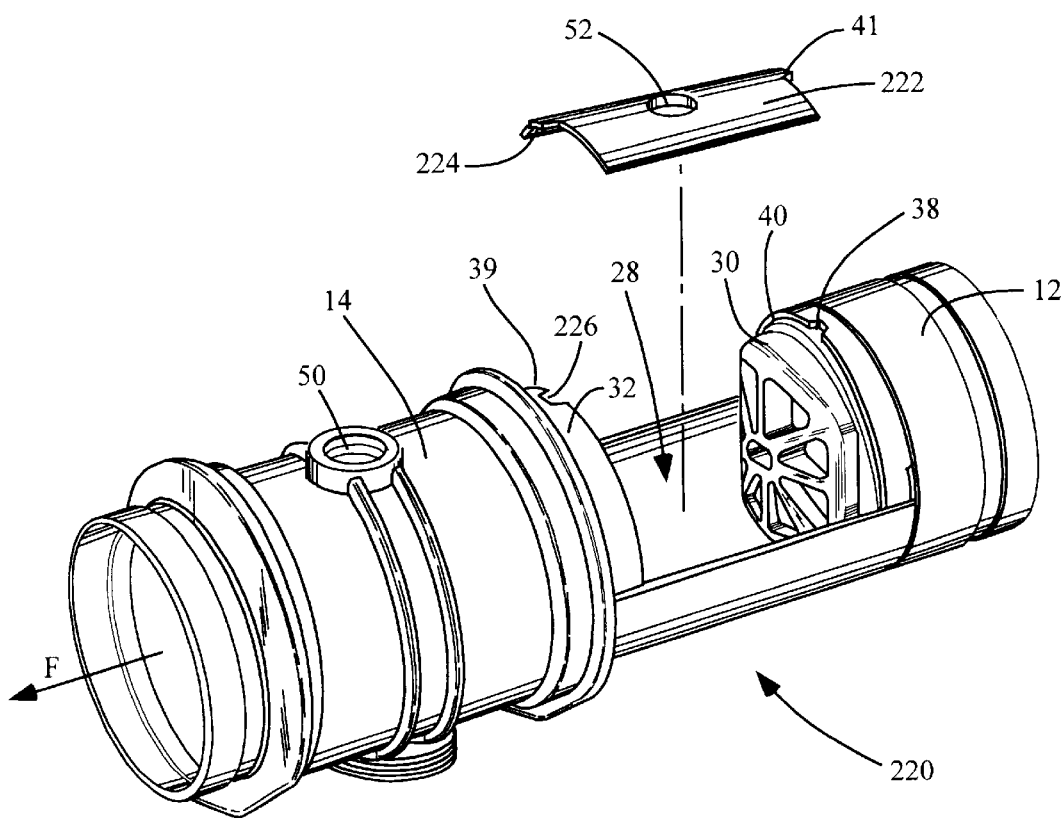
FIG. 19 is a partially exploded perspective view of an alternative embodiment backflow prevention apparatus in accordance with the invention.

Referring to FIG. 19, there is shown an alternative embodiment backflow prevention apparatus 220 in accordance with the invention, wherein like reference numbers are used to denote like parts. In the apparatus 220, a relatively small spacer 222 is used to hold check valves 30, 32 in place in generally the same manner as described above for spacer 37. The spacer 222 is more compact and light weight than spacer 37, and is preferred in some embodiments of the invention. Spacer 222 includes a protrusion 224 which engages a corresponding notch 226 in stop 39 in a similar manner as protrusion 41 engages notch 40 in stop 38. In all other respects, the apparatus 220 operates in the same manner as described above for the apparatus 10.

It should be readily under stood that the use of a valve body as provided by sleeve 14 and valve housing 12 is only one presently preferred embodiment of the invention, and check valves 30, 32 may be use d in virtually any backflow preventer valve body, including conventional valve bodies which use a side port extension and separate cover. Thus, the use of valve body 12 and sleeve 14 with check valves 30, 32 as described above should not be considered limiting. In still other embodiments, it is contemplated that sleeve 14 may be split such that sleeve 14 fits over housing 12 in a "clamshell" arrangement, with the two halves of the sleeve being joined together over lateral opening by conventional fastening hardware. In other embodiments, spacer 222 may be located adjacent the lower or bottom edge of check valves 30, 32. In still other embodiments, multiple spacers may be used to hold check valves 30, 32 in position Sleeve 14 need not be held in place by means of the hole 52 in spacer 222 (or spacer 37), and, in some embodiments of the invention, sleeve 14 may be held in place by bolting or otherwise coupling directly to valve housing 12.

Various additional arrangements for closure assemblies 128,192 are contemplated which are also considered to be within the scope of this disclosure. For example, in some embodiments, springs 134, 206 may be structured, configured and positioned to apply a bias to the second closure elements 132, 198, rather than the first closure elements 130, 194 as described above. Second closure elements 132, 198 preferably are split or bifurcated into halves, as described above, so that the ends of second closure elements 132, 198 are symmetrically positioned about the end of first closure elements 130, 194. In some embodiments, however, second closure elements 132, 198 may each comprise a single integral member, with only the ends being bifurcated.

While the first closure elements 130, 194 and second closure elements 132, 198 are each generally shown and described as single, elongated rigid linkages, the nature of the closure elements may be varied. For example, first closure elements 130, 194 may each comprise a single rigid linkage, while second closure elements 132, 198 each comprise two or more linkages, or a chain of linkages. First closure elements 130, 194 may also comprise a rotatable cam element, while second closure elements 132, 198 comprise a wire or other member which is responsive to a cam driver.

In the preferred embodiments, rods 140, 196 are mounted directly on valve seats 66, 72. In other embodiments, rods 140, 196 may be mounted on valve housing 12 instead of valve seats 66, 72. Alternatively, the first pivot point associated with linkage elements 130, 194 may be associated with a pin, pintle or other appropriate mechanical feature which provides a suitable pivot point. In general, the first pivot points at which first closure elements 130, 194 are pivotally coupled may be associated with any element or feature of valve seats 66, 72, valve body 12, or like structure which is positioned generally upstream from the corresponding seals 92, 122. While the third pivot point provided by pins 178, 202 associated with the ends of second closure elements 132, 198 is located generally at the center of clappers 68, 74 in the embodiments shown above, it is contemplated that the third pivot point may be elsewhere on clapper. In some embodiments, the closure mechanisms 128, 192 may be configured so that different closure forces are applied to clappers 68, 74. Various other arrangements for closure mechanisms 128, 192 will suggest themselves to those skilled in the art upon review of this disclosure, and are also considered to be within the scope of the present invention.

Accordingly, it will be seen that this invention provides a double check valve backflow prevention apparatus of lightweight, compact, modular construction which provides low flow losses and which maintains a small positive pressure differential under static flow conditions. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A check valve apparatus, comprising:
   (a) a valve seat having a fluid channel extending therethrough;
   (b) a clapper pivotally associated with said valve seat;
   (c) a seal positioned to sealingly engage said clapper and said valve seat when said clapper is positioned to close said fluid channel;
   (d) a first closure element pivotally coupled to a mounting point located upstream from said seal;
   (e) a second closure element movably coupled to said first closure element and movably coupled to said clapper; and
   (f) a bias element associated with at least one of said closure elements and configured to exert a closure force on said clapper.

2. The check valve apparatus of claim 1, wherein:
   (a) said first closure element has a first end and a second end, said first end coupled to said mounting point; and
   (b) said second closure element has a first end and a second end, said first end of said second closure element pivotally coupled to said second end of said first closure element, said second end of said second closure element pivotally coupled to said clapper.

3. The check valve apparatus of claim 2, wherein said second end of said second closure element is pivotally coupled to said clapper at a pivot point centrally located on said clapper.

4. The check valve apparatus of claim 1, wherein said clapper is pivotally associated with said clapper at a second mounting point located downstream from said valve seat.

5. The check valve apparatus of claim 1, wherein said seal is located on said clapper and a lip is included on said valve seat, said seal configured to sealingly engage said lip when said clapper is positioned to close said fluid channel.

6. The check valve apparatus of claim 1, further comprising a rod associated with said valve seat and extending across said fluid channel, said first closure element pivotally coupled to said rod, said rod defining said mounting point.

7. The check valve apparatus of claim 6, where in s aid valve seat further comprises first and second holders coupled thereto, said rod mounted in said holders.

8. The check valve apparatus of claim 1, wherein said mounting point is centrally positioned in said fluid channel.

9. The check valve apparatus of claim 6, wherein said bias element comprises a spring located on said rod and positioned to bias said first closure element.

10. The check valve apparatus of claim 1, wherein said first and second closure elements each comprise a single, rigid linkage.

11. The check valve apparatus of claim 1, wherein said first closure element comprises a single rigid linkage and said second closure element comprises at least two rigid linkages.

12. A backflow prevention apparatus, comprising:
   (a) a valve housing defining a flow stream;
   (b) at least one check valve assembly positioned within said valve housing in said flow stream, said check valve assembly including a valve seat having a fluid channel extending valves therethrough, and a clapper pivotally associated with said valve seal;
   (c) said check valve assembly including a seal positioned to scalingly engage said clapper and said valve seat when said clapper is positioned to close said fluid channel;
   (d) said check valve assembly including a first closure element pivotally coupled to a mounting point located upstream from said soal;
   (e) said check valve assembly including a second closure element movably coupled to said first closure element and movably coupled to said clapper; and (f) said check valve assembly including a bias element associated with at least one of said closure members and configured to exert a closure force on said clapper.

13. The backflow prevention apparatus of claim 14, wherein:
   (a) said first closure element has a first end and a second end said first is end coupled to said mounting point; and
   (b) said second closure element has a first end and a second end, said first end of said second closure element pivotally coupled to said second end of said first closure element, said second end of said second linkage element pivotally coupled to said clapper.

14. The backflow prevention apparatus of claim 12, wherein said second closure element is longer than said first closure element.

15. The backflow prevention apparatus of claim 12, wherein said seal is located on said clapper and a lip is included on said valve seat, said seal configured to sealingly engage said lip when said clapper is positioned to close said fluid channel.

16. The backflow prevention apparatus of claim 12, further comprising a rod associated with said valve seat and extending across said fluid channel, said mounting point located on said rod, said first closure element pivotally coupled to said rod.

17. The backflow prevention apparatus of claim 16, wherein said valve seat further comprises first and second holders coupled thereto, said rod mounted in said holders.

18. The backflow prevention apparatus of claim 12, wherein said mounting point is centrally positioned in a flow stream defined by said valve seat.

19. The backflow prevention apparatus of claim 12, wherein said clapper is pivotally coupled to a second mounting point located downstream from said valve seat.

20. The backflow prevention apparatus of claim 12, wherein said valve seat further comprises a seal configured to sealingly engage said valve housing.

21. The backflow prevention apparatus of claim 16, wherein said bias element comprises a spring located on said rod and positioned to bias said first closure element.

22. The backflow prevention apparatus of claim 12, wherein said second linkage element is curved in shape.

23. The backflow prevention apparatus of claim 12, wherein said second closure element comprise first and second halves, said first and second halves symmetrically positioned about said first closure element.

24. The check valve apparatus of claim 12, wherein said first and second closure elements each comprise a single, rigid linkage.

25. The check valve apparatus of claim 12, wherein said first closure element comprises a single rigid linkage and said second closure element comprises at least two rigid linkages.

26. A check valve apparatus, comprising:
   (a) a valve seat;
   (b) a seal associated with said valve seat;
   (c) a clapper movably associated with said valve seat and movably coupled to a first mounting point located downstream from said seal, said seal positioned to engage said clapper and said valve seat when said clapper is in a closed position;
   (d) a first closure element movably coupled to a second mounting point located upstream from said seal;
   (e) a second closure element movably coupled to said first closure element and movably coupled to said clapper; and
   (f) a bias element associated with at least one of said closure elements and configured to exert a closure force on said clapper.

27. A backflow prevention apparatus, comprising:
   (a) a valve housing defining a flow stream;
   (b) at least one check valve assembly positioned within said valve housing in said flow stream, said check valve assembly including a clapper and a seat, said clapper pivotally associated with said seat;
   (c) said check valve assembly including a seal positioned to sealingly engaging said clapper and said valve seat when said clapper is in a closed position;
   (d) said check valve assembly including a first linkage member pivotally mounted at a first pivot point positioned upstream from said seal;
   (e) said check valve assembly including a second linkage member pivotally coupled to said first linkage member at a second pivot point, and pivotally coupled to said clapper at a third pivot point; and
   (f) said check valve assembly including a bias element associated with at least one of said linkage members and configured to exert a closure force on said clapper.

* * * * *